US012491140B2

(12) United States Patent
deOliveira

(10) Patent No.: US 12,491,140 B2
(45) Date of Patent: Dec. 9, 2025

(54) INFANT PACIFIERS WITH INTERCHANGEABLE NIPPLES

(71) Applicant: Soothe Beginnings, Inc., Cataula, GA (US)

(72) Inventor: Lindsay deOliveira, Cataula, GA (US)

(73) Assignee: Soothe Beginnings, Inc., Cataula, GA (US)

( * ) Notice: Subject to any disclaimer, the term of this patent is extended or adjusted under 35 U.S.C. 154(b) by 34 days.

(21) Appl. No.: 18/777,267

(22) Filed: Jul. 18, 2024

(65) Prior Publication Data

US 2025/0025378 A1 Jan. 23, 2025

Related U.S. Application Data

(60) Provisional application No. 63/514,228, filed on Jul. 18, 2023.

(51) Int. Cl.
*A61J 17/00* (2006.01)

(52) U.S. Cl.
CPC ........... *A61J 17/105* (2020.05); *A61J 17/001* (2015.05)

(58) Field of Classification Search
CPC .............................. A61J 17/001; A61J 17/105
See application file for complete search history.

(56) References Cited

U.S. PATENT DOCUMENTS

| | | | | |
|---|---|---|---|---|
| 4,481,949 | A | 11/1984 | Kesselring et al. | |
| 5,176,705 | A | 1/1993 | Noble | |
| 6,468,294 | B2 * | 10/2002 | Griffith | A61J 17/105 601/67 |
| 9,855,194 | B1 | 1/2018 | Walter, Jr. | |
| 10,493,002 | B2 | 12/2019 | Chan et al. | |
| 2007/0021782 | A1 | 1/2007 | Inoue et al. | |
| 2024/0325255 | A1 * | 10/2024 | Bokvist | A61J 17/001 |

FOREIGN PATENT DOCUMENTS

DE 29504331 U1 7/1996

* cited by examiner

*Primary Examiner* — Todd J Scherbel
(74) *Attorney, Agent, or Firm* — Scale LLP

(57) ABSTRACT

A pacifier includes a shield with opposite front and rear surfaces, an opening substantially centered within the shield, and an annular sleeve extending from the rear surface. The annular sleeve is circumferentially aligned with a perimeter of the opening and comprises an inner surface with a notch. A nipple member includes an annular base, a nipple extending outwardly from a first end of the base, and a flange at an opposite second end. The nipple member is inserted through the shield opening with the nipple extending outward from the shield front surface. The annular base has an outwardly extending rib that mates with the notch to limit relative rotation. The flange abuts the distal free end of the shield annular sleeve. A cap is removably secured to the shield annular sleeve to maintain engagement of the nipple member and shield.

20 Claims, 8 Drawing Sheets

INFANT PACIFIERS WITH INTERCHANGEABLE NIPPLES

CROSS-REFERENCE TO RELATED APPLICATION(S)

This application claims the benefit of priority to U.S. Provisional Application No. 63/514,228, filed Jul. 18, 2023. The contents of each of the above referenced applications are hereby incorporated by reference in its entirety.

TECHNICAL FIELD

Various aspects of the present disclosure relate generally to infant care products and, more particularly, to infant pacifiers.

BACKGROUND

An infant pacifier generally includes a shield having an elastomeric nipple on one side and a handle on the other. Typically, the nipple, shield and handle are connected in such a way that they cannot be readily disconnected by the child in order to reduce the risk of choking. However, this has often meant that the nipple, shield and handle are permanently connected and cannot be readily detached from each other.

The present disclosure is directed to overcoming one or more of these above-referenced challenges.

SUMMARY OF THE DISCLOSURE

According to certain aspects of the disclosure, systems, methods, and computer readable memory are disclosed for infant pacifiers.

In some cases, a pacifier may include: a shield comprising opposite front and rear surfaces, an opening substantially centered within the shield, and an annular sleeve extending from the rear surface, wherein the annular sleeve is circumferentially aligned with a perimeter of the opening, wherein the annular sleeve comprises an inner surface, an outer surface, and a distal free end, and wherein a notch is formed within the inner surface; a nipple member comprising an annular base, a nipple extending outwardly from a first end of the annular base, and a flange at an opposite second end of the base, wherein the nipple member is inserted through the shield opening such that the nipple extends outward from the shield front surface, wherein the annular base comprises an outwardly extending rib that mates with the notch in the annular sleeve inner surface to limit relative rotation of the nipple member and shield, and wherein the flange abuts the distal free end of the shield annular sleeve; and a cap configured to maintain engagement of the nipple member and shield, wherein the cap is removably secured to the shield annular sleeve.

In some cases, a method of assembling a pacifier includes: providing a shield comprising opposite front and rear surfaces, an opening substantially centered within the shield, and an annular sleeve extending from the rear surface, wherein the annular sleeve is circumferentially aligned with a perimeter of the opening, wherein the annular sleeve comprises an inner surface, an outer surface, and a distal free end, and wherein a notch is formed within the inner surface; inserting a nipple member through the shield opening, wherein the nipple member comprises an annular base, a nipple extending outwardly from a first end of the annular base, and a flange at an opposite second end of the base, such that the nipple extends outward from the shield front surface; aligning an outwardly extending rib of the annular base with the notch in the annular sleeve inner surface to limit relative rotation of the nipple member and shield; positioning the flange to abut the distal free end of the shield annular sleeve; and securing a cap to the shield annular sleeve to maintain engagement of the nipple member and shield, wherein the cap is removably secured to the shield annular sleeve.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

DETAILED DESCRIPTION

Various aspects of the present disclosure relate generally to infant pacifier with interchangeable nipples.

INTRODUCTION

According to some embodiments, an infant pacifier includes a shield, a nipple member, and a cap. The shield includes opposite front and rear surfaces. An opening is substantially centered within the shield, and an annular sleeve extends from the rear surface.

The annular sleeve is circumferentially aligned with a perimeter of the opening and includes an inner surface, an outer surface, and a distal free end. A notch is formed within the annular sleeve inner surface.

The nipple member includes an annular base with opposite first and second ends. A nipple extends outwardly from the first end of the annular base, and a flange is located at the opposite second end of the base. The nipple member is inserted through the shield opening such that the nipple extends outward from the shield front surface. The annular base includes an outwardly extending rib that mates with the notch in the annular sleeve inner surface to limit relative rotation of the nipple member and shield during use. The flange abuts the distal free end of the shield annular sleeve when the pacifier is assembled.

The cap is configured to maintain engagement of the nipple member and shield and is removably secured to the shield annular sleeve. In some embodiments, the outer surface of the sleeve includes outwardly protruding locking members that engage an underside of the cap when the cap and sleeve are twisted relative to each other.

In some embodiments, the nipple member is formed from an elastomeric material, such as silicon, and has a constant thickness throughout.

In some embodiments, the nipple has a smooth outer surface.

In some embodiments, the nipple has a mesh-like structure with holes. In some embodiments, the nipple has a textured outer surface.

In some embodiments, the cap and the shield are formed from a paper-based composite material, such as Richlite®.

Figure 1:
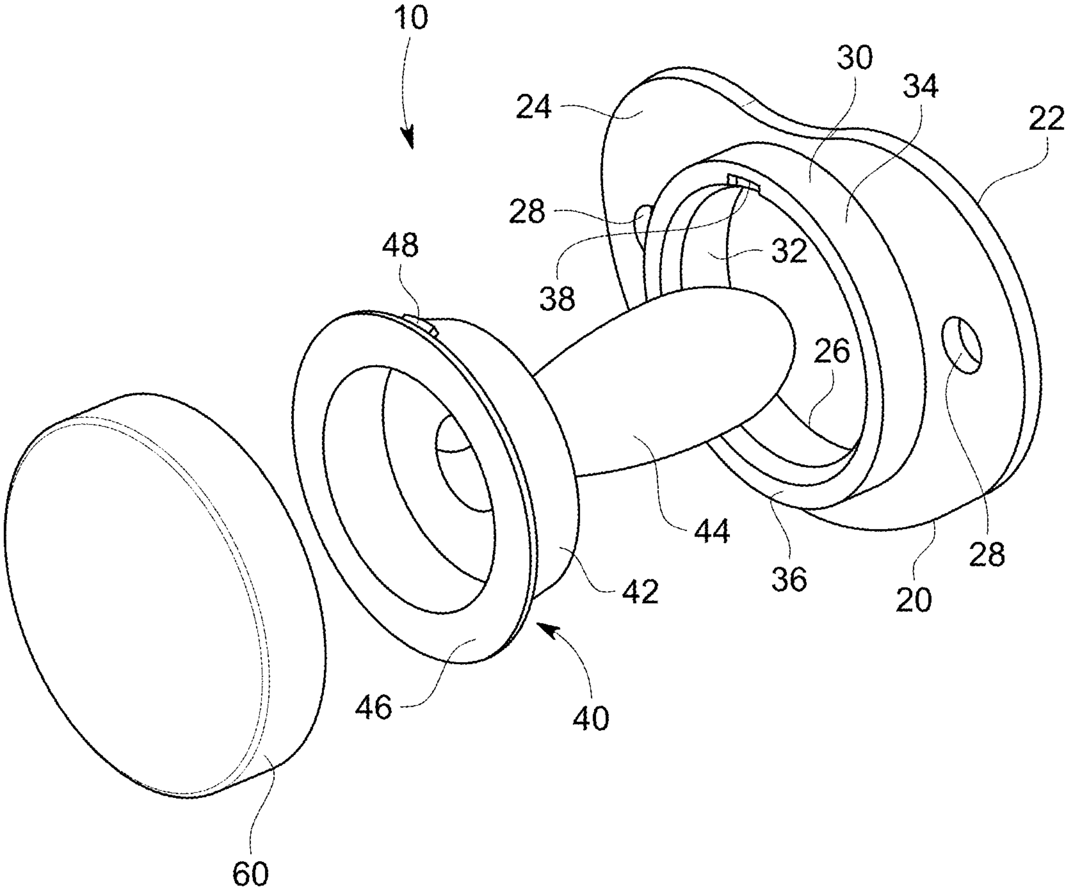
FIG. 1 illustrates an exploded view of a pacifier, according to aspects of the present disclosure.

For example, in FIG. 1, an infant pacifier 10, according to some embodiments of the present disclosure, includes a shield 20, a nipple member 40, and a cap 60. The shield 20 has a generally planar shape with opposite front and rear surfaces 22, 24.

Although, in some embodiments, the shield 20 may have an arcuate shape. An opening 26 is formed within the shield 20 and is substantially centered within the shield 20. The opening 26 is configured to receive the nipple member 40 therethrough. The illustrated shield 20 includes a ventilation aperture 28 on each side of the opening 26 (e.g., passing between the front and rear surfaces 22, 24). An annular sleeve 30 extends from the shield rear surface 24 and is circumferentially aligned with a perimeter of the opening 26, as illustrated. The annular sleeve 30 has an inner surface 32, an outer surface 34, and a distal free end 36.

A notch 38 is formed within the inner surface 32 of the shield as illustrated and is configured to engage (e.g., mate) with a rib in the nipple member 40. See, e.g., FIGS. 3A-3B for great detail of the notch 38. The inner surface 32 of the annular sleeve 30 has a tapered portion 32*t* adjacent the distal free end 36 as illustrated in FIG. 3B. The notch 38 begins at the distal free end 36 and extends through the tapered portion 32, as illustrated. The notch 38 has a generally rectangular configuration that is configured to matingly receive a correspondingly shaped rib 48 on the nipple member 40. However, the notch 38 and the rib 48 may have various shapes and configuration, and embodiments of the present disclosure are not limited to the illustrated shape and configuration of the notch 38 and the rib 48.

The illustrated nipple member 40 has an annular base 42, a nipple 44 extending outwardly from a first end 42*a* of the annular base 42, and a flange 46 at an opposite second end 42*b* of the base 42. The nipple member 40 is inserted through the shield opening 26 such that the nipple 44 extends outward from the shield front surface 22. The annular base 42 includes an outwardly extending rib 48 that is configured to mate with the notch 38 in the annular sleeve inner surface 32 to limit relative rotation of the nipple member 40 and shield 20 when the pacifier 10 is assembled. The flange 46 abuts the distal free end 36 of the shield annular sleeve 30 when the pacifier 10 is assembled.

In some embodiments, the nipple member 40 is formed from an elastomeric material, such as silicon, and has a constant thickness throughout. In some embodiments, the nipple 44 may have a mesh-like structure with holes, and the nipple 44 may have a hollow interior that is configured to receive frozen fruit and other such items therein. In some embodiments, the nipple 44 may have a textured outer surface. In some embodiments, the nipple 44 may have a smooth outer surface.

Figure 8:
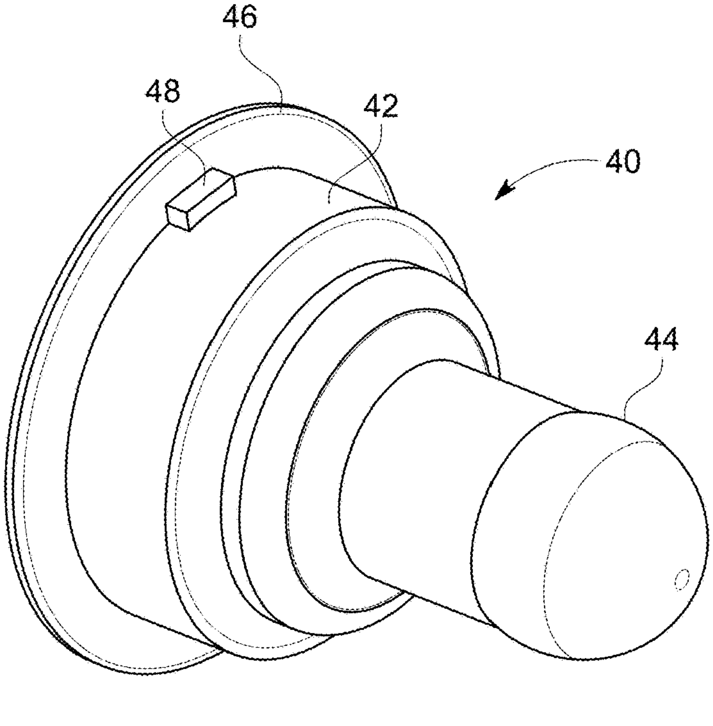
FIG. 8 illustrates a perspective view of another nipple member for a pacifier, according to an embodiment.
Figure 9:
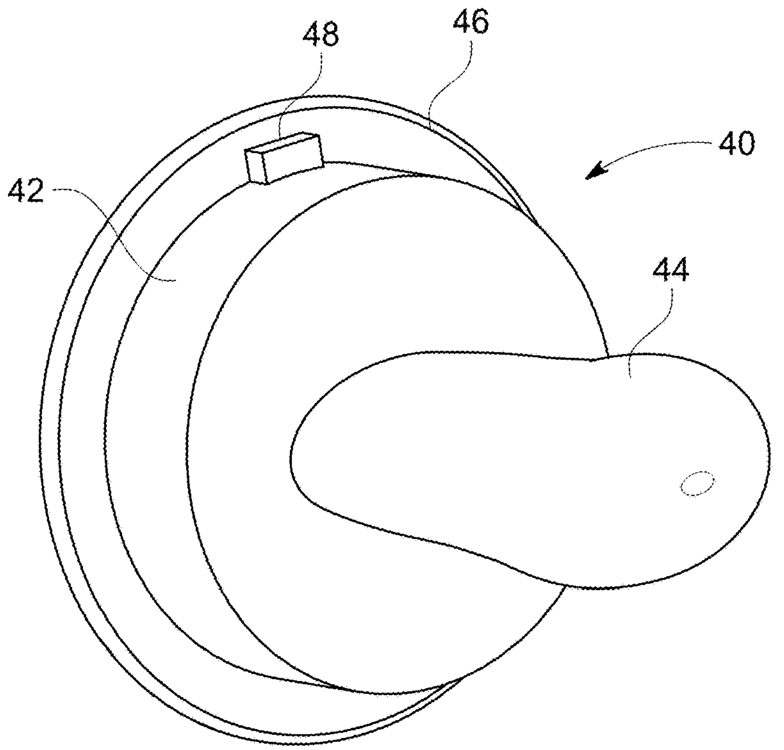
FIG. 9 illustrates a perspective view of yet another nipple member for a pacifier, according to aspects of the present disclosure.
Figure 10:
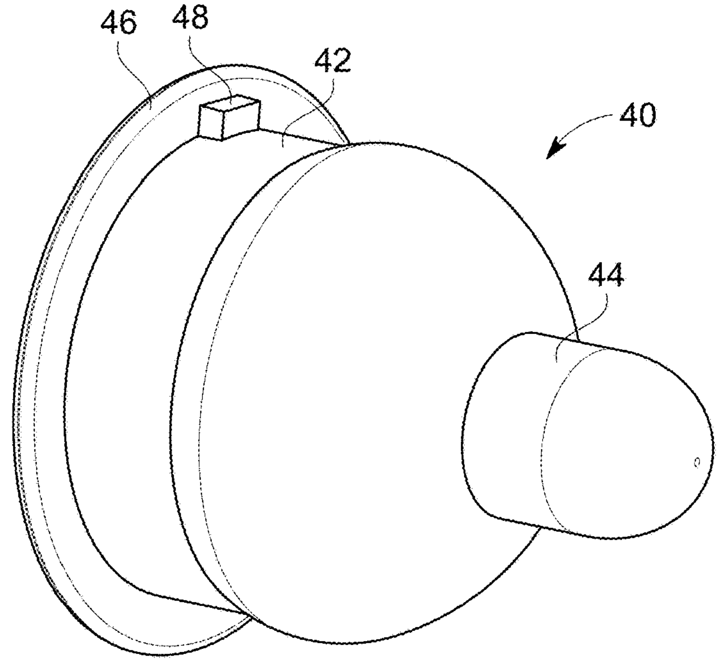
FIG. 10 illustrates a perspective view of still another nipple member for a pacifier, according to an embodiment.

The nipple member 40 may have various shapes and sizes, such as illustrated in FIGS. 8-10. Also, in some embodiments, a set of different size nipples may be provided (e.g., decreasing in size and used for weaning). Because the cap 60 is removably secured to the shield 20, the interchangeability of different nipple members 40 is facilitated.

The cap 60 is configured to maintain the engagement of the nipple member and shield such that the nipple member 40 cannot become dislodged from the shield 20 during use. The cap 60 is removably secured to the shield annular sleeve 30, such as via twist-lock features or threads.

In some embodiments, the cap 60 and the shield 20 may be formed from a paper-based composite material, such as Richlite®.

Further, an infant pacifier 10 according to other embodiments of the present disclosure may include similar or different features. See, e.g., FIGS. 4-11. The illustrated pacifier 10 is similar to the pacifier 10 illustrated in FIGS. 1, 2A-2B and 3A-3B in that the pacifier 10 includes a shield 20, a nipple member 40 and a cap 60. The illustrated shield 20 has a generally planar shape with opposite front and rear surfaces 22, 24. An opening 26 is formed within the shield 20 and is configured to receive the nipple member 40 therethrough. The illustrated shield 20 includes a ventilation aperture 28 on each side of the opening 26. An annular sleeve 30 extends from the shield rear surface 24 and is circumferentially aligned with a perimeter of the opening 26, as illustrated. The annular sleeve 30 has an inner surface 32, an outer surface 34, and a distal free end 36.

The outer surface 34 of the sleeve 30 includes laterally and oppositely extending locking members 70 that are configured to be removably engaged with the underside of the cap 60 when the cap 60 and sleeve 30 are engaged and twisted relative to each other. The illustrated locking members 70 have an arcuate shape, as illustrated. The locking members 70 are configured to be received within respective channels 80 formed within the cap 60. Each channel 80 has a tapered configuration such that, upon twisting the cap 60 and shield 20 relative to each other, each locking member 70 is compressed which provides a releasable yet secure connection between the cap 60 and the shield 20.

Figure 7:
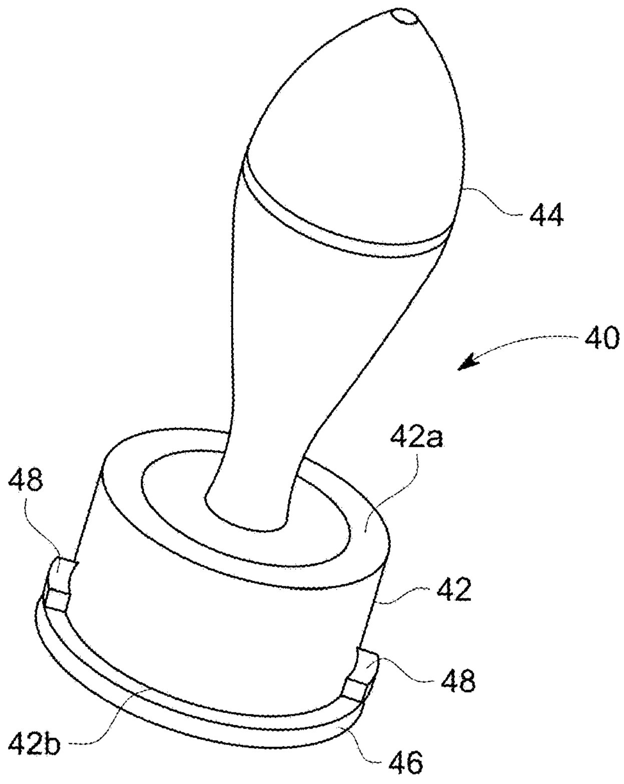
FIG. 7 illustrates a perspective view of a nipple member for a pacifier, according to aspects of the present disclosure.

The nipple member 40 illustrated in FIG. 7 includes an annular base 42, a nipple 44 extending outwardly from a first end 42*a* of the annular base 42, and a flange 46 at an opposite second end 42*b* of the base 42. The nipple member 40 is inserted through the shield opening 26 such that the nipple 44 extends outward from the shield front surface 22. The annular base 42 includes a pair of outwardly extending, opposing ribs 48 that are configured to mate with respective notches 38 in the annular sleeve inner surface 32 to limit relative rotation of the nipple member 40 and shield 20 when the pacifier 10 is assembled.

The notches 38 are formed by the arcuate locking members 70. The flange 46 abuts the distal free end 36 of the shield annular sleeve 30 when the pacifier 10 is assembled.

Pacifier Embodiments

The present disclosure relates to pacifiers for infants and young children. In some aspects, a pacifier may include a nipple portion, a shield portion, and a cap portion. In some cases, the pacifier may include a handle portion (not depicted, e.g., connected or is a part of the shield portion or cap portion). The nipple portion may be configured for insertion into an infant's mouth. The shield portion may be connected to the nipple portion and may be designed to remain outside the infant's mouth during use. The cap portion may engage the shield portion to retain the nipple portion in place. The handle portion may extend from the shield portion and may provide a gripping area for a caregiver or the infant.

The pacifier may, in some aspects, include a nipple portion fabricated from a soft, flexible material suitable for infant oral contact. The shield portion may be constructed from a rigid or semi-rigid material and may feature a curved or contoured shape designed to comfortably fit against an infant's face. In certain implementations, the handle portion may be integrated with the shield portion or may be separately attached.

Referring to FIG. 1, a pacifier 10 may comprise several main components, including a shield 20, a nipple member 40, and a cap 60. In some aspects, the shield 20 may include opposite front and rear surfaces 22, 24. The shield 20 may comprise an opening 26 that, in some cases, is substantially centered within the shield 20. An annular sleeve 30 may extend from the rear surface 24 of the shield 20. In certain implementations, the annular sleeve 30 may be circumferentially aligned with a perimeter of the opening 26.

The shield 20 may, in some cases, include one or more ventilation apertures 28. These ventilation apertures 28 may allow for air circulation and may help prevent moisture buildup during use of the pacifier 10.

In some aspects, the nipple member 40 may be inserted through the opening 26 of the shield 20. When assembled, the nipple 44 of the nipple member 40 may extend outward from the front surface 22 of the shield 20. This configuration may allow an infant to easily access and suckle on the nipple 44 while the shield 20 remains outside the infant's mouth.

The annular sleeve 30 may comprise an inner surface 32, an outer surface 34, and a distal free end 36. In some implementations, the inner surface 32 of the annular sleeve 30 may include at least one notch 38. This notch 38 may be designed to interact with corresponding features on the nipple member 40.

The nipple member 40 may consist of a base 42, the nipple 44 extending outwardly from the base 42, and a flange 46 at the opposite end of the base 42. In some cases, the base 42 may include at least one outwardly extending rib 48. This rib 48 may be configured to mate with a corresponding notch 38 in the annular sleeve 30 of the shield 20.

The cap 60 may be designed to be removably secured to the annular sleeve 30 of the shield 20. In some implementations, this configuration may allow the cap 60 to retain the nipple member 40 in place and maintain its orientation relative to the shield 20.

Figure 2A:
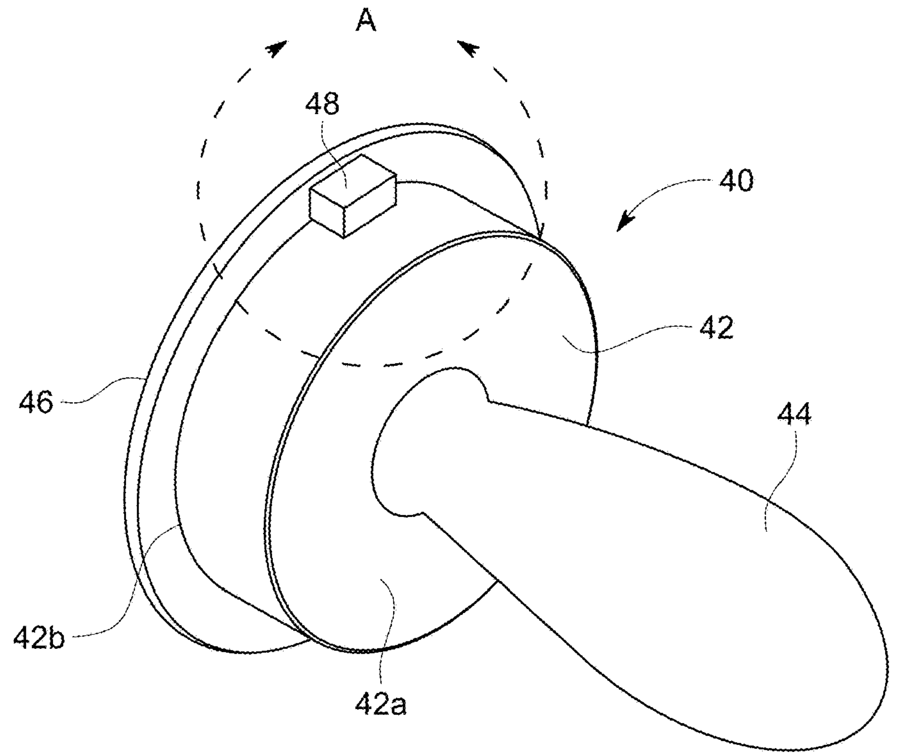
FIG. 2A illustrates a side view of a nipple member for a pacifier, according to an embodiment.

Referring to FIG. 2A, a nipple member 40 for a pacifier may comprise several components, including a base 42, a nipple 44, a flange 46, and a rib 48. In some aspects, the base 42 may be an annular structure with a first end 42*a* and a second end 42*b*. The nipple 44 may extend outwardly from the first end 42*a* of the base 42. In certain implementations, the flange 46 may be positioned at the opposite second end 42*b* of the base 42.

The nipple 44 may have an elongated shape that extends from the base 42, providing a suckling surface for an infant. In some cases, the nipple 44 may comprise an elastomeric material. The elastomeric material may include, but is not limited to, silicone, natural rubber, or synthetic rubber. In certain aspects, the nipple 44 may have a constant (or varied) thickness throughout its structure. The constant (or varied) thickness may contribute to uniform (or not) flexibility and durability of the nipple 44.

The flange 46 at the second end 42*b* may have a wider diameter than the base 42. In some implementations, this wider diameter may assist in securing the nipple member 40 to other components of the pacifier. For example, the flange 46 may be compressed between a cap and a sleeve of the pacifier assembly.

In some aspects, the rib 48 may protrude outwardly from the outer surface of the base 42. The rib 48 may be positioned between the first end 42*a* and the second end 42*b* of the base 42. In certain cases, the rib 48 may abut or be spaced apart from the flange 46. The rib 48 may be designed to mate with a corresponding notch in the pacifier's shield assembly. This mating configuration may serve to limit rotation of the nipple member 40 relative to the shield, ensuring proper orientation of the nipple 44 during use.

In some implementations, the nipple member 40 may include multiple ribs 48. For example, a pair of outwardly extending, opposing ribs may be configured to mate with respective notches in an annular sleeve of the pacifier shield. This configuration may provide enhanced stability and rotational control of the nipple member 40 within the pacifier assembly.

The design of the nipple member 40 may allow for easy assembly and disassembly of the pacifier. In some cases, this design may facilitate cleaning and maintenance of the pacifier. Additionally, the configuration of the nipple member 40 may allow for interchangeability, enabling the use of nipple members with different nipple shapes or sizes within the same pacifier assembly.

Figure 2B:
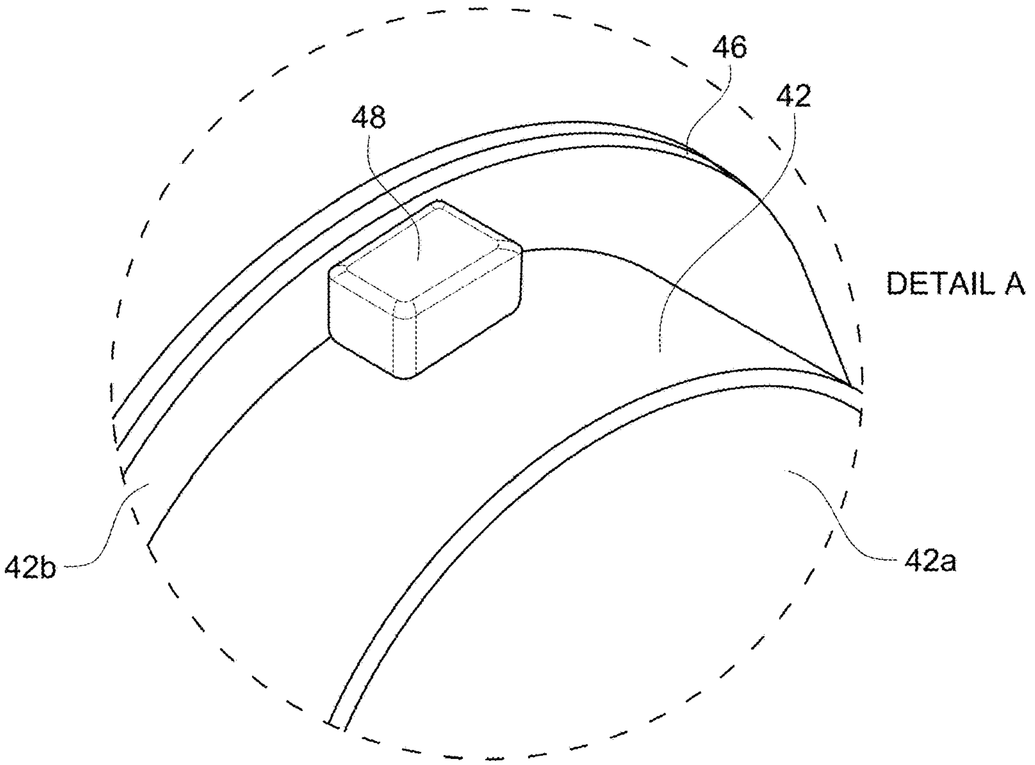
FIG. 2B illustrates a detailed view of a portion of the nipple member of FIG. 2A, according to an aspect of the present disclosure.

Referring to FIG. 2B, a detailed view of a portion of the nipple member 40 is shown, labeled as "DETAIL A". The figure illustrates a cross-sectional view of the base 42 of the nipple member 40. In some aspects, the base 42 may have a curved profile and may comprise several distinct features.

At one end of the base 42, the flange 46 may extend outward from the base 42. In some implementations, the flange 46 may extend axially from the base 42 in a flat disk-like shape. The flange 46 may have a curved shape, following the contour of the base 42. This curved shape may allow the flange 46 to conform to the shape of other components in the pacifier assembly.

Protruding from the outer surface of the base 42 may be a rib 48. In some aspects, the rib 48 may be depicted as a rectangular protrusion extending outward from the base surface. The rib 48 may serve as a mechanism for securing or aligning the base 42 within the pacifier assembly. In certain implementations, the base 42 may include one or more ribs 48.

The base 42 may be divided into two sections: a first end of the annular base 42*a* and a second end of the annular base 42*b*. In some cases, the first end 42*a* may be located at the top of the base 42, while the second end 42*b* may be indicated at the bottom. This division may contribute to the functionality of the nipple member 40 within the pacifier assembly.

The overall shape of the base 42 may be a curved, cylindrical structure designed to fit within a larger assembly. In some aspects, the various elements—the flange 46, rib 48, and the differentiated ends of the base 42*a*, 42*b*—may be integral parts of the base's design, contributing to its functionality within the complete pacifier structure.

In certain implementations, the rib 48 may be configured to mate with a corresponding notch in an annular sleeve of a pacifier shield. This mating configuration may serve to limit relative rotation of the nipple member 40 and the shield. By engaging the rib 48 with a notch, the nipple member 40 may be held in a specific orientation relative to the shield, which may help maintain proper positioning of the nipple during use.

The design of the base 42 with its various features may allow for secure attachment of the nipple member 40 to other components of the pacifier while also facilitating easy assembly and disassembly. This configuration may enable interchangeability of nipple members, allowing for the use of different nipple shapes or sizes within the same pacifier assembly.

Figure 3A:
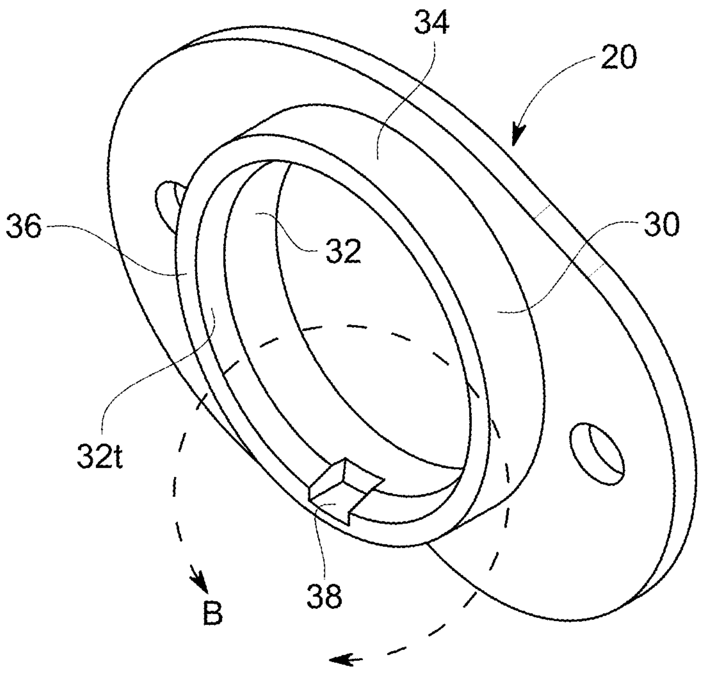
FIG. 3A illustrates a perspective view of a portion of a pacifier shield, according to an embodiment.
Figure 3B:
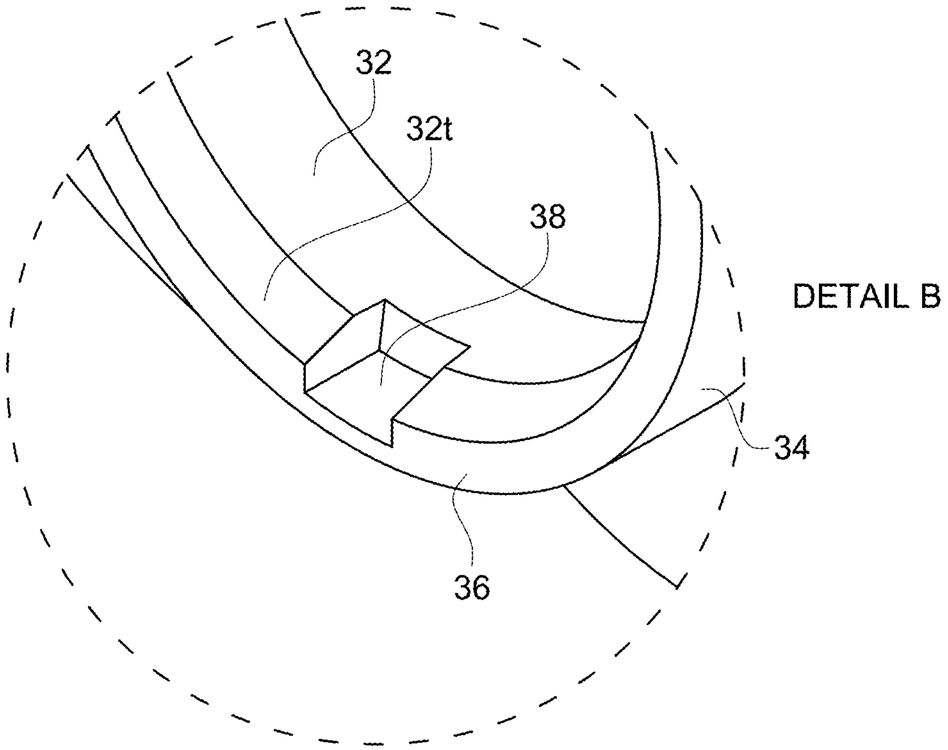
FIG. 3B illustrates a detailed sectional view of a portion of the pacifier shield of FIG. 3A, according to aspects of the present disclosure.

Referring to FIG. 3A, a portion of a pacifier is illustrated, focusing on the shield 20 and annular sleeve 30 components. In some aspects, the shield 20 may be partially shown, with the annular sleeve 30 extending from it. The annular sleeve 30 may comprise an inner surface 32 and an outer surface 34. In certain implementations, the inner surface 32 may include at least one notch 38. This notch 38 may have a matching profile to the rib 48 of the nipple member, for example, a rectangular recess within the sleeve.

The annular sleeve 30 may terminate at a distal free end 36. In some cases, adjacent to the distal free end 36, the inner surface 32 may feature a tapered portion 32*t*. This tapered portion 32*t* may gradually expand the inner diameter of the sleeve towards the distal free end 36 (and narrow the inner diameter sleeve towards the front surface). The tapered portion 32*t* may facilitate insertion of the nipple member or provide a more secure fit when assembled.

The figure may also show the curvature of the shield 20, indicating its three-dimensional shape. In some implementations, the annular sleeve 30 may extend perpendicularly from the shield 20, creating a cylindrical protrusion. This configuration may allow for proper alignment and secure attachment of the nipple member and cap.

The structural design of the annular sleeve 30 and its features may provide mating functionality of this portion of the pacifier. In particular, the notch 38 and tapered portion 32*t* may ensure the assembly and functionality of the complete pacifier device. For example, the notch 38 may interact with corresponding features on the nipple member to limit rotation, while the tapered portion 32*t* may assist in guiding components during assembly or provide a compression fit.

In some aspects, the annular sleeve 30 may be circumferentially aligned with a perimeter of an opening in the shield 20. This alignment may ensure proper positioning of the nipple member when inserted through the opening. The configuration of the annular sleeve 30, including its surfaces, notch, and tapered portion, may contribute to the overall stability and functionality of the pacifier assembly.

Referring to FIG. 3B, a detailed sectional view of a portion of the annular sleeve 30 is illustrated, labeled as "DETAIL B". In some aspects, the annular sleeve 30 may comprise an inner surface 32 and an outer surface 34. The inner surface 32 may form a concave curve, while the outer surface 34 may form the convex side of the curved structure, mirroring the shape of the inner surface 32 but with a smooth, uninterrupted profile.

In certain implementations, a notch 38 may be formed within the inner surface 32 of the annular sleeve 30. The notch 38 may be represented by an indentation in the inner surface 32. In some cases, the notch 38 may have a rectangular configuration. This rectangular configuration may correspond to the shape of a rib on the nipple member, allowing for a secure mating between the components.

The annular sleeve 30 may terminate at a distal free end 36. In some aspects, the distal free end 36 may be open, continuously with the opening 26, allowing for insertion of the nipple member into the opening and engagement with the notch 38.

Adjacent to the distal free end 36, the inner surface 32 may feature a tapered portion 32*t*. In certain implementations, this tapered portion 32*t* may gradually widen the inner diameter of the structure as it approaches the distal free end 36. The tapered portion 32*t* may serve various functions, such as guiding the insertion of the nipple member, facilitating assembly, or providing a more secure fit when the pacifier is assembled.

The combination of these features—the inner surface 32, outer surface 34, distal free end 36, notch 38, and tapered portion 32*t*—may form a part of the pacifier's design, contributing to its assembly and functionality. For example, the notch 38 may interact with a corresponding rib on the nipple member to limit relative rotation between the components. The tapered portion 32*t* may assist in aligning and securing the nipple member within the annular sleeve 30.

In some cases, the annular sleeve 30 may include multiple notches 38 formed within the inner surface 32. These notches 38 may be positioned at various locations around the circumference of the inner surface 32, corresponding to multiple ribs on the nipple member. This configuration may provide enhanced stability and rotational control of the nipple member within the pacifier assembly.

The design of the annular sleeve 30, with its specific features such as the notch 38 and tapered portion 32*t*, may allow for secure attachment of the nipple member while also facilitating easy assembly and disassembly of the pacifier. This configuration may enable interchangeability of nipple members, allowing for the use of different nipple shapes or sizes within the same pacifier assembly.

Figure 4:
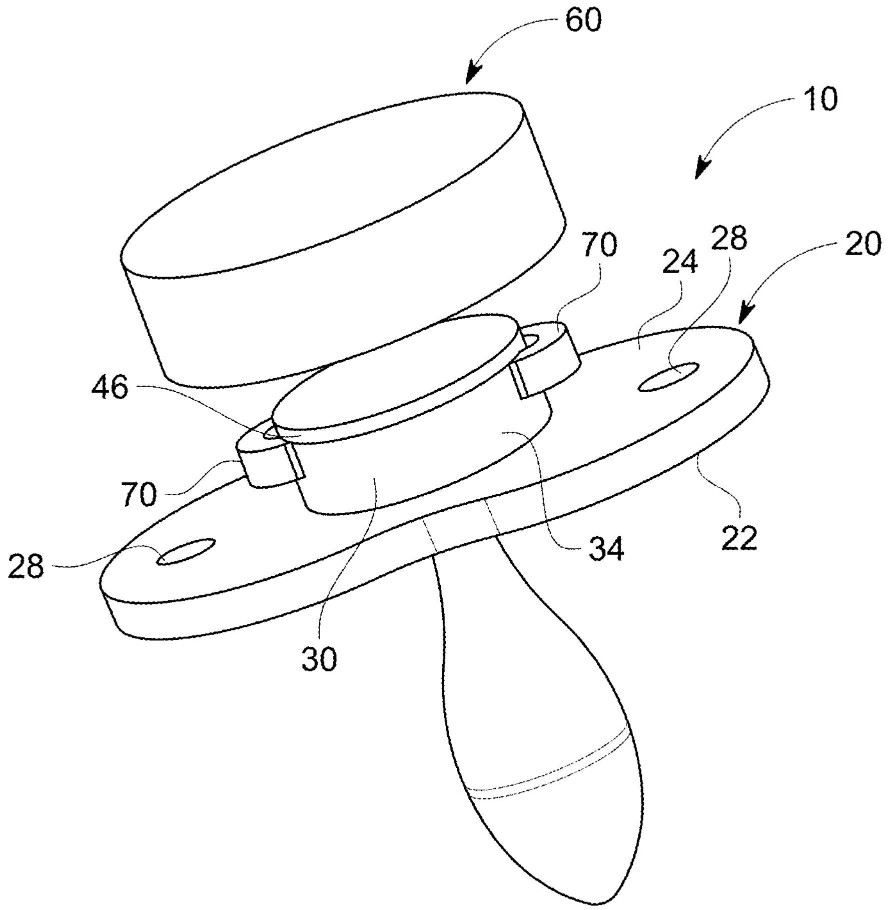
FIG. 4 illustrates an exploded view of a pacifier, according to an embodiment.

Referring to FIG. 4, an exploded view of a pacifier 10 is illustrated. In some aspects, the pacifier 10 may comprise several components, including a shield 20, an annular sleeve 30, a flange 46, and a cap 60.

The shield 20 may form the main body of the pacifier 10 and may include a front surface 22 and a rear surface 24. The shield 20 may comprise one or more ventilation apertures 28, which may allow for air circulation.

Extending from the shield 20 may be the annular sleeve 30, which may have an outer surface 34. In some cases, the annular sleeve 30 may be designed to accommodate other components of the pacifier 10. The flange 46 may be positioned above and abutting the distal free end of the annular sleeve 30. This configuration may help secure the nipple member within the pacifier assembly.

The cap 60 is shown separated from the other components, positioned above the shield 20. In some implementations, the cap 60 may be designed to fit over the annular sleeve 30 and may be configured to maintain engagement of the nipple member and shield. The cap 60 may be removably secured to the shield annular sleeve 30, allowing for disassembly and reassembly of the pacifier 10 as needed.

In certain aspects, locking members 70 may be visible on the outer surface 34 of the annular sleeve 30. These locking members 70 may be designed to engage with the cap 60 when the pacifier 10 is assembled. In some cases, the locking members 70 may comprise outwardly protruding structures that engage an underside of the cap 60 when the cap 60 and sleeve 30 are twisted relative to each other. This configuration may provide a secure attachment mechanism while still allowing for removal of the cap 60 when necessary.

The exploded view may demonstrate how these components are arranged and how they may fit together to form the complete pacifier 10. This design may allow for easy assembly and disassembly, which can facilitate cleaning and maintenance of the pacifier 10. In some implementations, this configuration may also allow for interchangeable nipple members, with different nipple shapes or sizes.

Figure 5:
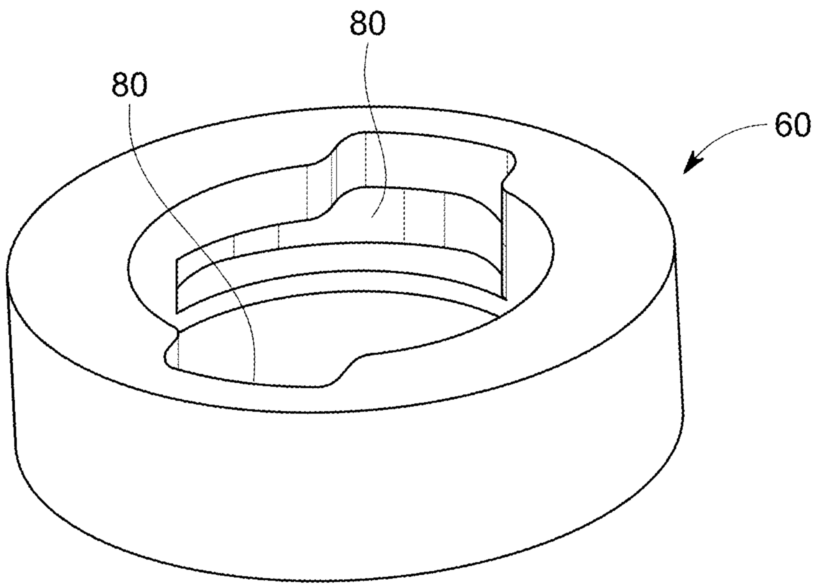
FIG. 5 illustrates a perspective view of a cap for a pacifier, according to aspects of the present disclosure.

Referring to FIG. 5, a perspective view of a cap 60 component of a pacifier is illustrated. In some aspects, the cap 60 may be shown as a circular disc-like component designed to fit over the annular sleeve 30 of the pacifier shield. The cap 60 may be configured to maintain engagement of the nipple member and shield when assembled.

In certain implementations, the cap 60 may be secured to the shield annular sleeve 30 via a twist-lock mechanism. This mechanism may allow for easy attachment and removal of the cap 60 while providing a secure connection during use.

Inside the cap 60, tapered channels 80 may be visible. These tapered channels 80 may be grooves or indentations within the inner surface of the cap 60. In some cases, the tapered channels 80 may be arranged in a circular pattern, corresponding to the circular shape of the cap 60.

The tapered channels 80 may be configured to receive locking members located on the outer surface of the annular sleeve 30. The tapered configuration of the channels 80 may facilitate engagement with the locking members and may contribute to the security of the twist-lock mechanism. As the cap 60 is twisted onto the annular sleeve 30, the locking members may slide along the tapered channels 80, gradually tightening the connection between the cap 60 and the annular sleeve 30.

In some aspects, the tapered configuration of the channels 80 may allow for a range of engagement positions, accommodating slight variations in manufacturing tolerances or wear over time. This design may help ensure a consistently secure fit between the cap 60 and the annular sleeve 30.

The cap 60 and its internal features, such as the tapered channels 80, may be manufactured from various materials. In some implementations, the cap 60 may comprise a paper-based composite material, which may provide durability while offering environmental benefits.

Figure 6:
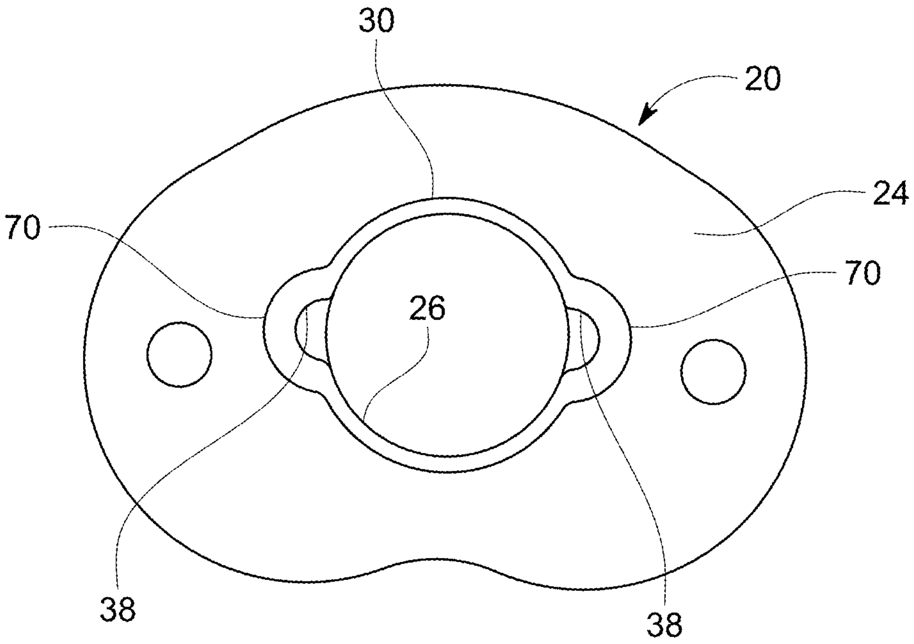
FIG. 6 illustrates a rear view of a pacifier shield, according to an embodiment.

Referring to FIG. 6, a rear view of a pacifier component is illustrated. In some aspects, the rear surface 24 of a shield 20 may be shown. The shield 20 may have an overall curved shape (e.g., butterfly-like or other design). In certain implementations, the shield 20 may have an arcuate shape, which may allow it to comfortably conform to an infant's face during use.

At the center of the shield 20, an opening 26 may be present. In some cases, this opening 26 may be surrounded by an annular sleeve 30 that extends from the rear surface 24 of the shield 20. The annular sleeve 30 may be circumferentially aligned with the perimeter of the opening 26.

Within the inner circumference of the annular sleeve 30, the annular sleeve 30 includes two notches 38. These notches 38 may be positioned opposite each other and may be designed to interact with corresponding ribs on a nipple member. In certain aspects, the notches 38 may serve to limit rotation of the nipple member relative to the shield 20.

The shield 20 may also include two locking members 70. In some cases, these locking members 70 may be circular protrusions located on either side of the central opening 26. The locking members 70 may be positioned on the outer surface of the annular sleeve 30 and may be designed to engage with a cap to secure the assembly. In certain implementations, the locking members 70 may have an arcuate shape, which may facilitate smooth engagement with corresponding features on the cap.

In some aspects, the shield 20 may include one or more ventilation apertures. These ventilation apertures may allow for air circulation and may help prevent moisture buildup during use of the pacifier.

The overall design of the shield 20 and its components may allow for the secure attachment of a nipple and a cap, while also providing a comfortable shape for the user (e.g., infant). The arcuate shape of the shield 20, combined with the positioning of the locking members 70 and the configuration of the notches 38, may contribute to the functionality and ease of assembly of the pacifier.

Referring to FIG. 7, a perspective view of a nipple member 40 for a pacifier is illustrated. In some aspects, the nipple member 40 may comprise a base 42 and an elongated nipple portion extending from the base 42. The base 42 may include a first end 42*a*, which may be connected to the nipple portion, and an opposite second end 42*b*. At the second end 42*b*, a flange 46 may extend outwardly from the base 42. In certain implementations, the flange 46 may have a circular shape and a larger diameter than the base 42.

The base 42 may feature outwardly extending ribs 48 positioned on opposite sides. In some cases, the nipple member 40 may comprise a pair of outwardly extending, opposing ribs 48 configured to mate with respective notches in the annular sleeve inner surface of the pacifier's shield component. This configuration may provide enhanced stability and rotational control of the nipple member 40 within the pacifier assembly.

The nipple portion of the nipple member 40 may have a generally elongated, tapered shape that extends from the first end 42*a* of the base 42. In some implementations, the nipple portion may have a smooth outer surface. This smooth surface may provide a comfortable suckling experience for an infant and may facilitate easy cleaning of the nipple member 40.

The design of the nipple member 40 may allow for secure attachment to other components of the pacifier while providing a suitable shape for an infant to suckle on. The ribs 48 and flange 46 may contribute to the proper positioning and retention of the nipple member 40 within the pacifier assembly. In some aspects, the configuration of the ribs 48 may limit relative rotation between the nipple member 40 and the shield, ensuring proper orientation of the nipple during use.

The nipple member 40 may be manufactured from various materials. In some implementations, the nipple portion may comprise an elastomeric material, which may provide flexibility and durability. The elastomeric material may include, but is not limited to, silicone, natural rubber, or synthetic rubber.

In certain aspects, the design of the nipple member 40 may allow for easy assembly and disassembly of the pacifier. This configuration may facilitate cleaning and maintenance of the pacifier components. Additionally, the design may enable interchangeability, allowing for the use of nipple members with different nipple shapes or sizes within the same pacifier assembly.

Referring to FIG. 8, a perspective view of a nipple member 40 for a pacifier is illustrated. In some aspects, the nipple member 40 may comprise several components, including a base 42, a nipple 44, a flange 46, and a rib 48. The base 42 may form the central portion of the nipple member 40, providing structural support for the other components.

Extending outwardly from one end of the base 42 may be the nipple 44. In some implementations, the nipple 44 may have a cylindrical shape with a rounded tip. The surface of the nipple 44 may be varied, providing different textures or features for an infant to interact with during use. In certain aspects, the nipple 44 may comprise a mesh-like structure with holes, which may offer a unique suckling experience or facilitate the delivery of liquids or medications.

At the opposite end of the base 42 from the nipple 44 may be the flange 46. In some cases, the flange 46 may extend radially outward and have a circular shape. The flange 46 may be designed to abut against a shield or other component of the pacifier, helping to secure the nipple member 40 in place within the pacifier assembly.

Located on the outer surface of the base 42 may be the rib 48. In some implementations, the rib 48 may protrude outwardly and have a rectangular shape. The rib 48 may be positioned near the junction of the base 42 and the flange 46. This rib 48 may be configured to mate with a corresponding notch in the pacifier's shield to limit relative rotation between the nipple member 40 and the shield.

The design of the nipple member 40 may allow for secure attachment to the pacifier shield while providing a comfortable suckling surface for an infant. In some aspects, the various components of the nipple member 40 may work together to create a functional and safe pacifier nipple. The configuration of the base 42, nipple 44, flange 46, and rib 48 may facilitate easy assembly and disassembly of the pacifier, allowing for thorough cleaning or replacement of components as needed.

In certain implementations, the nipple member 40 may be removable and interchangeable with nipple members of different sizes or shapes. This interchangeability may allow caregivers to adapt the pacifier to an infant's changing needs or preferences over time.

The materials used for the nipple member 40 may vary. In some cases, the nipple 44 may comprise an elastomeric material, which may provide flexibility and durability. The elastomeric material may include, but is not limited to, silicone, natural rubber, or synthetic rubber. In certain aspects, the nipple 44 may have a constant thickness throughout its structure, which may contribute to uniform flexibility and wear characteristics.

Referring to FIG. 9, a perspective view of a nipple member 40 for a pacifier is illustrated. In some aspects, the nipple member 40 may comprise several components, including a base 42, a nipple 44, a flange 46, and a rib 48.

The base 42 may form the main body of the nipple member 40, providing structural support for the other components. In some implementations, the base 42 may have a circular shape and a hollow interior. This hollow interior may allow for flexibility of the base 42 and may contribute to the overall comfort of the pacifier during use.

Extending outwardly from one end of the base 42 may be the nipple 44. In certain aspects, the nipple 44 may have a bulbous shape with a rounded tip, designed for an infant to suckle on. A small opening may be provided at the tip of the nipple 44. This opening may allow for air flow.

At the opposite end of the base 42 from the nipple 44 may be the flange 46. In some implementations, the flange 46 may extend outward from the base 42, creating a wider circular rim. The flange 46 may serve to secure the nipple member 40 to other components of the pacifier. In certain aspects, the flange 46 may be compressed between a cap and an annular sleeve of the pacifier assembly, helping to maintain the position of the nipple member 40.

Located on the outer surface of the base 42 may be the rib 48. In some cases, the rib 48 may be depicted as a small, rectangular protrusion. The rib 48 may be positioned between the nipple 44 and the flange 46. This rib 48 may function to engage with other parts of the pacifier assembly, to limit rotation or ensure proper alignment of the nipple member 40 within the pacifier.

The design of the nipple member 40 may integrate these components to form a single unit that can be attached to and removed from the pacifier assembly. In some aspects, this configuration may allow for easy cleaning and maintenance of the nipple member 40. The arrangement of these elements may allow for the nipple 44 to be exposed for use while the base 42, flange 46, and rib 48 facilitate secure attachment to the pacifier structure.

In certain implementations, the nipple member 40 may be manufactured from various materials. The nipple 44 may comprise an elastomeric material, which may provide flexibility and durability. The elastomeric material may include, but is not limited to, silicone, natural rubber, or synthetic rubber. In some cases, the base 42, flange 46, and rib 48 may be made from the same material as the nipple 44, or they may be made from a different material to provide specific structural properties.

The nipple member 40 may be designed to be removable and interchangeable with nipple members of different sizes or shapes. This interchangeability may allow caregivers to adapt the pacifier to an infant's changing needs or preferences over time. In some aspects, the configuration of the base 42, flange 46, and rib 48 may facilitate this interchangeability while ensuring secure attachment to the pacifier assembly.

Referring to FIG. 10, a perspective view of a nipple member 40 for a pacifier is illustrated. In some aspects, the nipple member 40 may comprise several components, including a base 42, a nipple 44, a flange 46, and a rib 48.

The base 42 may form the main body of the nipple member 40, providing structural support for the other components. In some implementations, the base 42 may have a cylindrical shape that tapers towards the nipple 44. This tapered design may facilitate insertion of the nipple member 40 into the pacifier assembly and may contribute to a secure fit.

The nipple 44 may extend outwardly from one end of the base 42. In certain aspects, the nipple 44 may have a rounded, elongated shape designed for an infant to suckle on. The shape and size of the nipple 44 may vary to accommodate different age groups or suckling preferences.

At the opposite end of the base 42 from the nipple 44 may be the flange 46. In some cases, the flange 46 may be a circular, disc-like structure that extends outward from the base 42, creating a wider surface area. The flange 46 may serve multiple purposes, such as preventing the nipple member 40 from being inserted too far into an infant's mouth and providing a surface for securing the nipple member 40 within the pacifier assembly.

The rib 48 may be a small, rectangular protrusion located on the outer surface of the base 42, near the flange 46. In some implementations, the rib 48 may be designed to mate with a corresponding notch in the pacifier shield to limit rotation of the nipple member 40. This feature may help maintain proper orientation of the nipple 44 during use.

In certain aspects, the nipple member 40 may include multiple ribs 48 positioned around the circumference of the base 42. These multiple ribs 48 may provide enhanced stability and rotational control within the pacifier assembly.

The design of the nipple member 40 may allow for secure attachment to the pacifier shield while providing a comfortable suckling surface for an infant. In some cases, the configuration of the base 42, nipple 44, flange 46, and rib 48 may facilitate easy assembly and disassembly of the pacifier, allowing for thorough cleaning or replacement of components as needed.

The materials used for the nipple member 40 may vary. In some implementations, the entire nipple member 40 may be made from a single material, such as an elastomeric compound. In other cases, different components may be made from different materials to optimize specific properties. For example, the nipple 44 may comprise a soft, flexible material for comfort, while the base 42 and flange 46 may be made from a more rigid material for structural integrity.

In some aspects, the nipple 44 may have a textured outer surface. This texture may provide sensory stimulation for the infant and may help soothe teething discomfort. Alternatively, the nipple 44 may have a smooth outer surface, which may be easier to clean and may be preferred by some infants.

The nipple member 40 may be designed to be removable and interchangeable with nipple members of different sizes or shapes. This interchangeability may allow caregivers to adapt the pacifier to an infant's changing needs or preferences over time, while maintaining the use of the same shield and cap components.

Figure 11:
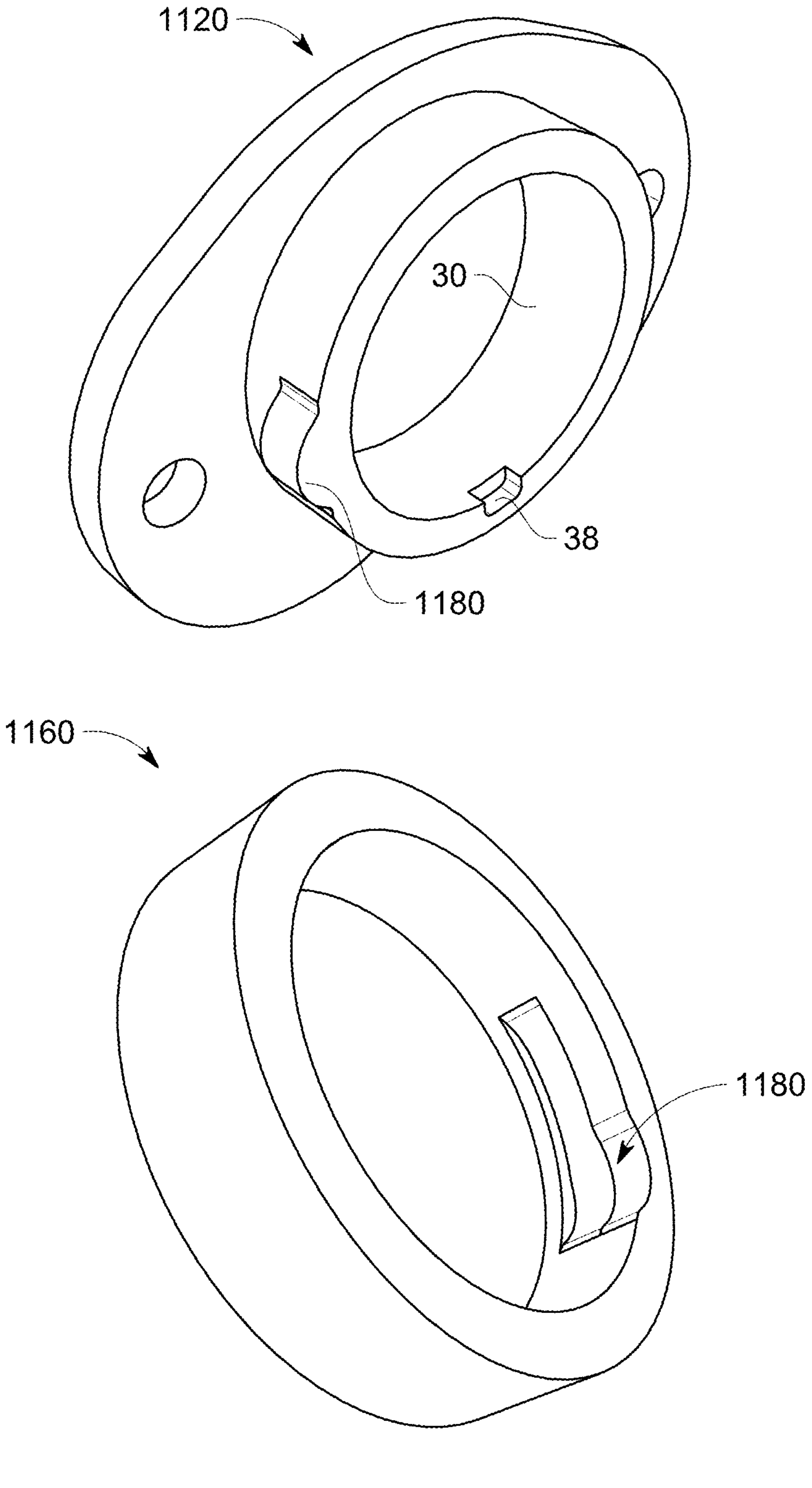
FIG. 11 illustrates components of a pacifier assembly, according to aspects of the present disclosure.

Referring to FIG. 11, different versions of components of a pacifier assembly are illustrated. The figure may be divided into two parts, showing different elements of the assembly.

The left side of the figure may depict a second guard 1120. In certain implementations, the second guard 1120 may have a circular shape with a central opening. An annular sleeve 30 may extend from the second guard 1120. On the outer surface of the annular sleeve 30, the annular sleeve 30 may include a second locking member 1170. The second locking member 1170 may protrude outward from the annular sleeve 30. In some cases, the second locking member 1170 may be a semi-circular protrusion from the outer surface of the annular sleeve 30.

The inner surface of the annular sleeve 30 may include a notch 38. This notch 38 may be designed to interact with corresponding features on a nipple member to limit rotation or ensure proper alignment.

The right side of the figure may show a second cap 1160 configured to engage the second guard 1120. In some aspects, the second cap 1160 may have a circular shape designed to fit over the second guard 1120. On the inner surface of the second cap 1160, a second channel 1180 may be visible. This second channel 1180 may have a partial opening on a sidewall of an end that faces the second guard 1120.

In certain implementations, the second channel 1180 may allow the second locking member 1170 to pass through and enter a cavity of the cap in the sidewall. The cavity may vary in dimension, allowing for engagement of the second locking member 1170 under pressure and compression.

The design of these components may allow for their assembly in the pacifier structure. In some aspects, the second locking member 1170 on the second guard 1120 may be configured to engage with the second channel 1180 in the second cap 1160, providing a secure connection. This engagement may occur as the second cap 1160 is twisted onto the second guard 1120, with the second locking member 1170 sliding along the second channel 1180.

The configuration of the second guard 1120 and second cap 1160 may provide an alternative securing mechanism. In some cases, this design may offer advantages such as easier assembly or disassembly, enhanced security, or improved durability.

The materials used for the second guard 1120 and second cap 1160 may vary. In some implementations, these components may comprise a paper-based composite material, which may provide durability while offering environmental benefits.

The design of the second guard 1120 and second cap 1160 may allow for interchangeability with other pacifier components. In some aspects, this interchangeability may enable caregivers to mix and match different components to suit their preferences or the needs of the infant.

In some aspects, the nipple 44 may comprise an elastomeric material. The elastomeric material may include, but is not limited to, silicone. Silicone may provide desirable properties such as flexibility, durability, and heat resistance. In certain implementations, the nipple 44 may have a constant thickness throughout its structure, which may contribute to uniform flexibility and wear characteristics.

The nipple 44 may, in some cases, comprise a mesh-like structure with holes. This mesh-like configuration may provide a unique texture for the infant to interact with during use. The holes in the mesh-like structure may allow for air flow or facilitate the delivery of liquids or medications.

In certain aspects, the nipple 44 may comprise a textured outer surface. The textured surface may provide sensory stimulation for the infant and may help soothe teething discomfort. The texture may vary in pattern or intensity, offering different sensory experiences.

The cap 60 and the shield 20 may each comprise a paper-based composite material in some implementations. This material choice may provide durability while offering environmental benefits. The paper-based composite may be engineered to withstand repeated use and cleaning while maintaining its structural integrity.

In some aspects, the nipple member 40 may be removable and interchangeable with nipple members of different sizes. This interchangeability may allow caregivers to adapt the pacifier to an infant's changing needs or preferences over time. The design of the base 42, flange 46, and rib 48 may facilitate this interchangeability while ensuring secure attachment to the pacifier assembly.

Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.," which derives from the Latin phrase "exempli gratia," may be used to introduce or specify a general example or examples of a previously mentioned item, and is not intended to be limiting of such item. The common abbreviation "i.e.," which derives from the Latin phrase "id est," may be used to specify a particular item from a more general recitation.

It will be understood that although the terms first, second, third, etc., may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of the present inventive concepts. The same reference numerals or the same reference designators denote the same or similar elements throughout the specification.

The terms "about" and "approximately", as used herein with respect to a value or number, means that the value or number can vary by up to +/−twenty percent (20%).

EXAMPLES

Exemplary embodiments of the systems and methods disclosed herein are described in the numbered paragraphs below.

A1. A pacifier, comprising: a shield comprising opposite front and rear surfaces, an opening substantially centered within the shield, and an annular sleeve extending from the rear surface, wherein the annular sleeve is circumferentially aligned with a perimeter of the opening, wherein the annular sleeve comprises an inner surface, an outer surface, and a distal free end, and wherein a notch is formed within the inner surface; a nipple member comprising an annular base, a nipple extending outwardly from a first end of the annular base, and a flange at an opposite second end of the base, wherein the nipple member is inserted through the shield opening such that the nipple extends outward from the shield front surface, wherein the annular base comprises an outwardly extending rib that mates with the notch in the annular sleeve inner surface to limit relative rotation of the nipple member and shield, and wherein the flange abuts the distal free end of the shield annular sleeve; and a cap configured to maintain engagement of the nipple member and shield, wherein the cap is removably secured to the shield annular sleeve.

A2. The pacifier of A1, wherein the outer surface of the sleeve comprises outwardly protruding locking members that engage an underside of the cap when the cap and sleeve are twisted relative to each other.

A3. The pacifier of any of A1-A2, wherein the nipple comprises an elastomeric material and has a constant thickness throughout.

A4. The pacifier of A3, wherein the elastomeric material comprises silicon.

A5. The pacifier of any of A1-A4, wherein the nipple comprises a mesh-like structure with holes.

A6. The pacifier of any of A1-A5, wherein the nipple comprises a textured outer surface.

A7. The pacifier of any of A1-A6, wherein the cap and the shield each comprise a paper-based composite material.

A8. The pacifier of any of A1-A7, wherein the shield comprises one or more ventilation apertures.

A9. The pacifier of any of A1-A8, wherein the nipple member is removable and interchangeable with nipple members of different sizes.

A10. The pacifier of any of A1-A9, wherein the shield has an arcuate shape.

A11. The pacifier of any of A1-A10, wherein the cap is secured to the shield annular sleeve via a twist-lock mechanism.

A12. The pacifier of any of A1-A11, wherein the notch in the annular sleeve inner surface has a rectangular configuration.

A13. The pacifier of any of A1-A12, wherein the inner surface of the annular sleeve comprises a tapered portion adjacent the distal free end.

A14. The pacifier of any of A1-A13, wherein the nipple member comprises a pair of outwardly extending, opposing ribs configured to mate with respective notches in the annular sleeve inner surface.

A15. The pacifier of any of A1-A14, wherein the outer surface of the sleeve comprises outwardly protruding locking members that engage an underside of the cap when the cap and sleeve are twisted relative to each other, and the locking members have an arcuate shape.

A16. The pacifier of any of A1-A15, wherein the outer surface of the sleeve comprises outwardly protruding locking members that engage an underside of the cap when the cap and sleeve are twisted relative to each other, and the cap comprises channels configured to receive locking members.

A17. The pacifier of A16, wherein the channels have a tapered configuration.

A18. The pacifier of any of A1-A17, wherein the nipple has a smooth outer surface.

A19. The pacifier of any of A1-A18, wherein the shield opening is substantially centered within the shield.

A20. A method of assembling a pacifier, comprising: providing a shield comprising opposite front and rear surfaces, an opening substantially centered within the shield, and an annular sleeve extending from the rear surface, wherein the annular sleeve is circumferentially aligned with a perimeter of the opening, wherein the annular sleeve comprises an inner surface, an outer surface, and a distal free end, and wherein a notch is formed within the inner surface; inserting a nipple member through the shield opening, wherein the nipple member comprises an annular base, a nipple extending outwardly from a first end of the annular base, and a flange at an opposite second end of the base, such that the nipple extends outward from the shield front surface; aligning an outwardly extending rib of the annular base with the notch in the annular sleeve inner surface to limit relative rotation of the nipple member and shield; positioning the flange to abut the distal free end of the shield annular sleeve; and securing a cap to the shield annular sleeve to maintain engagement of the nipple member and shield, wherein the cap is removably secured to the shield annular sleeve.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A pacifier, comprising:

a shield comprising opposite front and rear surfaces, an opening substantially centered within the shield, and an annular sleeve extending from the rear surface, wherein the annular sleeve is circumferentially aligned with a perimeter of the opening, wherein the annular sleeve comprises an inner surface, an outer surface, and a distal free end, and wherein a notch is formed within the inner surface;

a nipple member comprising an annular base, a nipple extending outwardly from a first end of the annular base, and a flange at an opposite second end of the base, wherein the nipple member is inserted through the shield opening such that the nipple extends outward from the shield front surface, wherein the annular base comprises an outwardly extending rib that mates with the notch in the annular sleeve inner surface to limit relative rotation of the nipple member and shield, and wherein the flange abuts the distal free end of the shield annular sleeve; and a cap configured to maintain engagement of the nipple member and shield, wherein the cap is removably secured to the shield annular sleeve.

2. The pacifier of claim 1, wherein the outer surface of the sleeve comprises outwardly protruding locking members that engage an underside of the cap when the cap and sleeve are twisted relative to each other.

3. The pacifier of claim 1, wherein the nipple comprises an elastomeric material and has a constant thickness throughout.

4. The pacifier of claim 3, wherein the elastomeric material comprises silicon.

5. The pacifier of claim 1, wherein the nipple comprises a mesh-like structure with holes.

6. The pacifier of claim 1, wherein the nipple comprises a textured outer surface.

7. The pacifier of claim 1, wherein the cap and the shield each comprise a paper-based composite material.

8. The pacifier of claim 1, wherein the shield comprises one or more ventilation apertures.

9. The pacifier of claim 1, wherein the nipple member is removable and interchangeable with nipple members of different sizes.

10. The pacifier of claim 1, wherein the shield has an arcuate shape.

11. The pacifier of claim 1, wherein the cap is secured to the shield annular sleeve via a twist-lock mechanism.

12. The pacifier of claim 1, wherein the notch in the annular sleeve inner surface has a rectangular configuration.

13. The pacifier of claim 1, wherein the inner surface of the annular sleeve comprises a tapered portion adjacent the distal free end.

14. The pacifier of claim 1, wherein the nipple member comprises a pair of outwardly extending, opposing ribs configured to mate with respective notches in the annular sleeve inner surface.

15. The pacifier of claim 1, wherein the outer surface of the sleeve comprises outwardly protruding locking members that engage an underside of the cap when the cap and sleeve are twisted relative to each other, and the locking members have an arcuate shape.

16. The pacifier of claim 1, wherein the outer surface of the sleeve comprises outwardly protruding locking members that engage an underside of the cap when the cap and sleeve are twisted relative to each other, and the cap comprises channels configured to receive the locking members.

17. The pacifier of claim 16, wherein the channels have a tapered configuration.

18. The pacifier of claim 1, wherein the nipple has a smooth outer surface.

19. The pacifier of claim 1, wherein the shield opening is substantially centered within the shield.

20. A method of assembling a pacifier, comprising:

providing a shield comprising opposite front and rear surfaces, an opening substantially centered within the shield, and an annular sleeve extending from the rear surface, wherein the annular sleeve is circumferentially aligned with a perimeter of the opening, wherein the annular sleeve comprises an inner surface, an outer surface, and a distal free end, and wherein a notch is formed within the inner surface;

inserting a nipple member through the shield opening, wherein the nipple member comprises an annular base, a nipple extending outwardly from a first end of the annular base, and a flange at an opposite second end of the base, such that the nipple extends outward from the shield front surface;

aligning an outwardly extending rib of the annular base with the notch in the annular sleeve inner surface to limit relative rotation of the nipple member and shield;

positioning the flange to abut the distal free end of the shield annular sleeve; and securing a cap to the shield annular sleeve to maintain engagement of the nipple member and shield, wherein the cap is removably secured to the shield annular sleeve.

* * * * *